United States Patent [19]

Schroeder et al.

[11] Patent Number: 5,513,972
[45] Date of Patent: May 7, 1996

[54] SURFACE GENERATING DEVICE SUITABLE FOR GENERATING A DIE, MOLD OR FIXTURE SURFACE

[75] Inventors: Thaddeus Schroeder, Rochester Hills; Robin Stevenson, Bloomfield Hills, both of Mich.

[73] Assignee: General Motors Corporation, Detroit, Mich.

[21] Appl. No.: 9,703

[22] Filed: Jan. 27, 1993

[51] Int. Cl.⁶ .................................................. B28B 7/02
[52] U.S. Cl. .......................... 425/175; 249/78; 249/79; 249/155; 249/161; 264/219; 425/144
[58] Field of Search .................. 249/78, 79, 155, 249/158, 161; 264/219; 425/175, 195, 143, 144

[56] References Cited

U.S. PATENT DOCUMENTS

| | | | |
|---|---|---|---|
| 626,427 | 6/1899 | Jones | 269/266 |
| 1,312,268 | 8/1919 | Poffinbarger . | |
| 1,826,783 | 10/1931 | Hess . | |
| 1,898,251 | 2/1933 | Kopp . | |
| 2,410,888 | 11/1946 | Lucy | 249/155 |
| 2,442,022 | 5/1948 | Schulz | 249/155 |
| 2,486,494 | 11/1949 | Rice | 81/38 |
| 2,968,838 | 1/1961 | Hicks . | |
| 3,596,869 | 3/1971 | Humphrey | 249/155 |
| 3,599,471 | 8/1971 | Whitacre | 72/414 |
| 4,200,272 | 4/1980 | Godding | 269/26 |
| 4,208,574 | 6/1980 | Schafer | 249/78 |
| 4,335,986 | 6/1982 | Fahrner | 409/116 |
| 4,338,068 | 7/1982 | Suh et al. | 249/78 |
| 4,390,491 | 6/1983 | Woodall | 425/175 |
| 4,572,564 | 2/1986 | Cipolla | 294/88 |
| 4,731,144 | 3/1988 | Kommineni et al. | 249/155 |
| 4,936,560 | 6/1990 | Barozzi | 269/266 |
| 5,151,277 | 9/1992 | Bernardon et al. | 249/155 |
| 5,192,560 | 3/1993 | Umetsu et al. | 249/155 |
| 5,330,343 | 7/1994 | Berteau | 425/175 |

FOREIGN PATENT DOCUMENTS

| | | | |
|---|---|---|---|
| 1-197026 | 8/1989 | Japan | 76/107.1 |
| 1063738 | 3/1967 | United Kingdom | 249/78 |

*Primary Examiner*—C. Scott Bushey
*Attorney, Agent, or Firm*—George A. Grove

[57] ABSTRACT

A device is provided which is capable of generating a surface that at least partially conforms to the contour of an article. The surface is defined by the ends of a number of threaded members which are supported within a suitable support structure. The threaded members are aligned so as to be substantially parallel to and threadably engaged with each other. As a result, rotation of an individual threaded member will cause that threaded member to be longitudinally moved relative to its adjacent threaded members and the support structure, without displacing an adjacent threaded member. The surface can be readily configured manually or automatically to serve as a die or mold cavity when the entire surface has been generated to conform to the entire contour of the article. Alternatively, the surface can be generated so as to provide a suitable fixture surface for supporting and securing a workpiece during a machining or welding operation. Due to its method of generation, the surface can be quickly and repeatedly reconfigured to conform to an article or workpiece having a completely different contour.

14 Claims, 5 Drawing Sheets

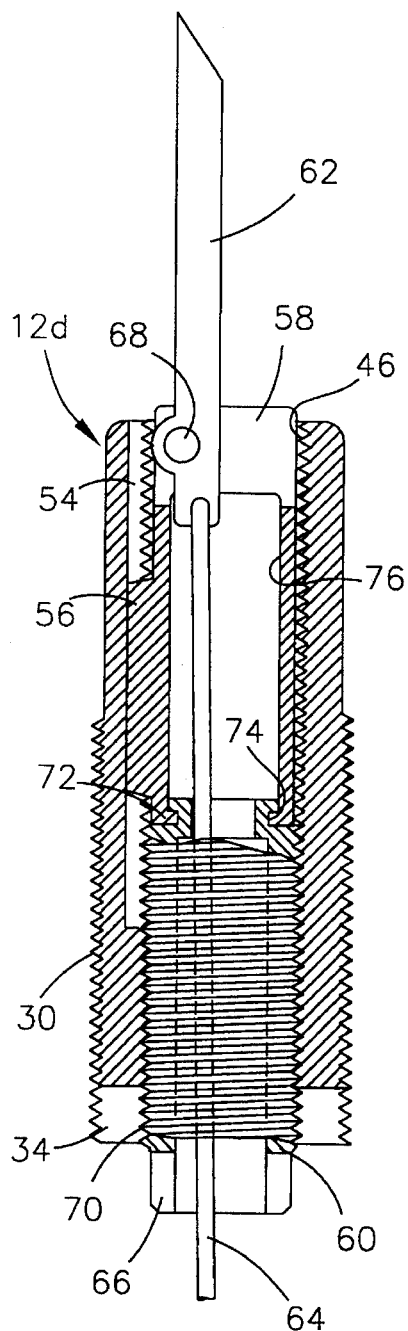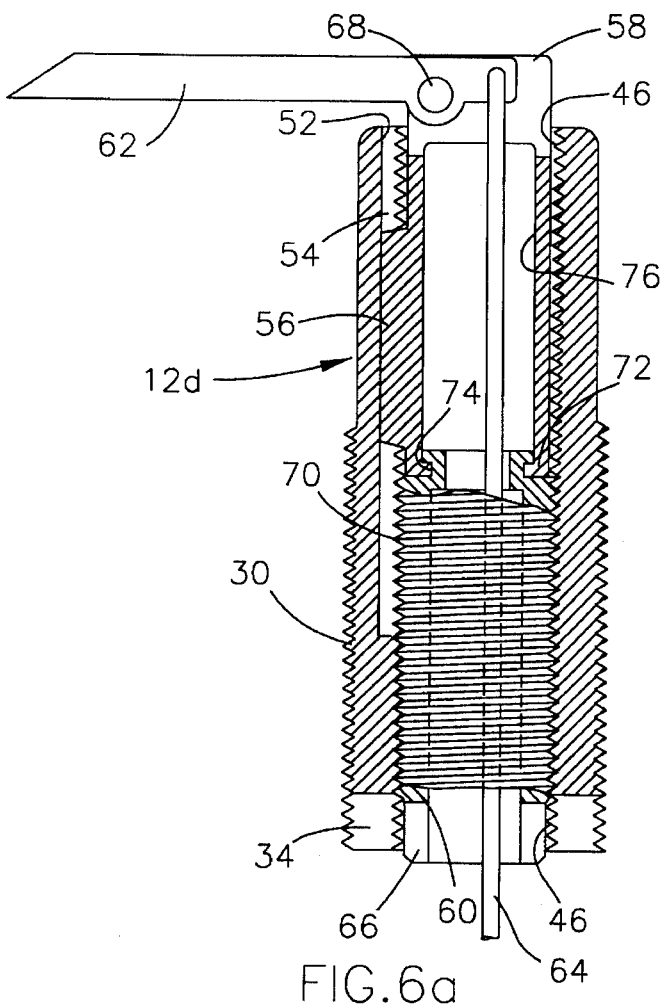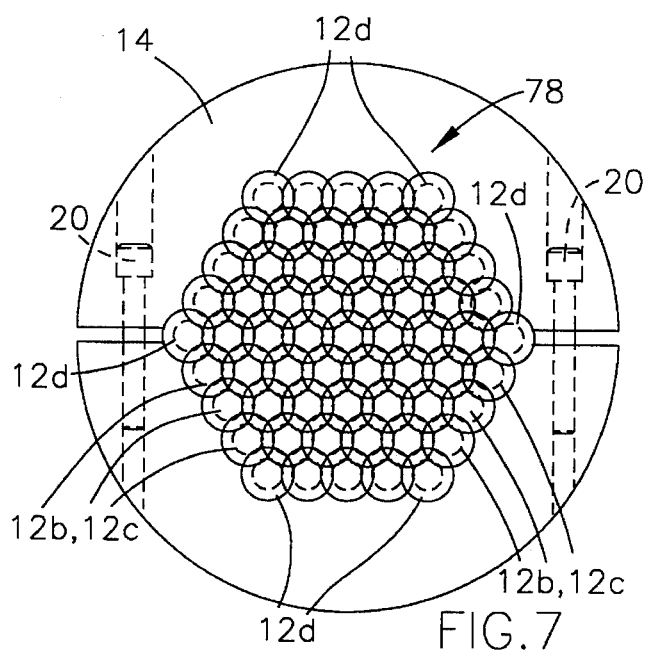
FIG.6a
FIG.6b
FIG.7

SURFACE GENERATING DEVICE SUITABLE FOR GENERATING A DIE, MOLD OR FIXTURE SURFACE

The present invention generally relates to equipment used in the production and processing of manufactured articles and components. More particularly, this invention relates to a surface generating device which can be readily configured to form the surface of a die, mold or fixture, wherein the surface generating device can be quickly and accurately configured so as to be particularly suitable for producing prototype or short-run production components.

BACKGROUND OF THE INVENTION

Modern manufacturing and prototype operations have created a demand for manufacturing equipment which can be readily produced and assembled for the purpose of producing prototype and short-run components by various methods. As a particular example, current computer-aided design and manufacturing technology which is employed to develop dies used in metal forming processes often rely on computer simulations of the particular metal forming process to reduce the design time and tooling costs for the die, as well as the time necessary to verify the design of the die. The quality of the finished die directly impacts the quality of the article produced. Thus, a rapidly produced die of lesser quality may result in additional time and costs to finish the article, which therefore increases the overall time and cost required to produce a finished article. Consequently, dies which are rapidly designed to be economical for use in prototype and short production runs are often achieved as a trade-off in die quality and life.

Nonetheless, much attention has been devoted to the development of processes for the rapid manufacturing of dies, particularly draw dies used in stamping operations. The benefits associated with rapidly produced draw dies are apparent. As an example, lower cost dies offer a manufacturer the opportunity to compete in niche or limited volume markets. In addition, the ability to rapidly obtain a draw die when developing a process facilitates the ability to have a component ready for prototype assembly, while also subsequently facilitating the production line die design.

However, rapidly produced dies have a significant disadvantage, in that such dies can be more readily made if produced from materials which are softer than the conventional cast iron used. In particular, this issue is paramount when attempting to obtain "cast-to-size" dies, which generally employ plastics or other less durable materials which have a lower melting point than cast iron. As a result, the durability of rapidly produced dies is often inferior to that of conventional dies, such that some limitation must be placed on the volume of parts produced from the die before the die requires reworking or reconstruction.

A suggested alternative to conventional methods of die making has been the use of an assembly of hard metal rods or pins which are frictionally held together by a suitable frame member. The hard metal rods provide a more durable die surface than the materials typically used for rapidly-produced dies, such as those noted above. An obvious disadvantage is that the die surface will not be smooth. However, a less obvious disadvantage associated with the use of the rods is that of achieving accurate rod placement. One approach is to use a reverse model of the desired surface. However, this approach negates much of the time advantage sought by seeking a rapidly-produced die, since forming a suitable model is often time consuming and costly.

To alleviate the need for a model, it has been suggested to use electromechanical drives and sensors to position the rods to their assigned positions based on known surface data for the article to be produced. However, the friction between adjacent rods which serves to keep each rod in its proper place also tends to dislodge adjacent rods while an individual rod is being positioned. If all of the rods are being positioned simultaneously to overcome this drawback, the driver and sensor system tends to be much too complex for a die of any significant size.

Thus, it would be desirable to provide a die which could be rapidly produced, assembled and adapted for a particular use in a minimal amount of time, so as to be particularly suitable for use in manufacturing prototype and short-ran components. The above discussion is also applicable to the making of molds for molding processes, such as for plastic molding and die casting operations, as well as for other manufacturing processes, such as machining and welding operations, which have conventionally required different solutions. Similar to the situation described above for dies, modern manufacturing and prototype operations have created a demand for fixtures which can be readily produced and adapted for the purpose of producing prototype and short-ran components by various machining and joining methods. Also similar to dies, the ability to rapidly produce a fixture having the proper dimensional characteristics for a given component becomes of great importance, particularly for prototype and short-ran articles, wherein the time and costs required to produce the necessary fixtures represents a significant proportion of the total manufacturing time and costs for the article to be produced.

Fixturing irregularly-shaped parts is often quite tedious, particularly where the article being fixtured does not have suitably rigid locations for restraining the article, such that the article tends to be distorted by the forces generated by the fixture to secure the article. Customized fixturing is often required to properly support, locate and clamp such articles, resulting in fixtures that are both time consuming and costly to produce. Again, such fixturing is not an economical option when prototype or short-run production is the goal, particularly in view of the fact that a specially configured fixture will most likely be unsuitable for use with any other article.

Thus, as stated previously, it would be desirable to provide manufacturing equipment, such as dies, molds and fixtures, which could be rapidly produced, assembled and adapted for a particular use in a minimal amount of time, so as to be particularly suitable for use in manufacturing prototype and short-run components. Such rapidly-produced dies and molds would only be feasible if they could be readily and accurately produced, such that the time necessary to develop the dies and molds was minimized. Suitable rapidly-produced fixtures would preferably be readily adaptable and reconfigurable so as to locate, support, and clamp components having various geometries and shapes, such that the fixtures would be reusable and therefore economical for use in manufacturing prototype and short-run components.

SUMMARY OF THE INVENTION

It is an object of this invention to provide a surface generating device which can be configured so as to at least partially conform to the contour of an article to be formed or worked.

It is a further object of this invention that such a device be capable of generating a surface which is suitable for use as a die, mold or fixture in manufacturing and processing operations.

Lastly, it is yet another object of this invention that such a device be constructed of a number of aligned elements which can be individually positioned without adversely effecting the position of adjacent elements, such that the surface defined by the ends of the elements can be readily modified by longitudinally positioning one or more of the elements, and wherein the surface can be configured to define a die or mold cavity which closely conforms to the desired contours of an article, or a fixture capable of supporting, locating and clamping a component for machining or joining operations.

In accordance with a preferred embodiment of this invention, these and other objects and advantages are accomplished as follows.

According to the present invention, there is provided a device capable of generating a surface which can be configured to at least partially conform to the contour of an article. The surface is defined by the ends of a number of threaded members which are supported within a support structure. The threaded members are oriented within the support structure so as to be substantially parallel to and threadably engaged with each other. As a result, rotation of an individual threaded member will cause that threaded member to be longitudinally moved relative to its adjacent threaded members and the support structure, without imposing rotation on its adjacent threaded members.

Appropriate longitudinal positioning of each of the threaded members can be performed such that at least a portion of the surface, as defined by the ends of the threaded members, will conform to at least a portion of the contour of the article. As a result, the type of surface features possible with the surface generating device of this invention is only limited by the number and diameter of the threaded members used. For example, generating a very intricate and contoured surface would require a large number of threaded members having relatively small diameters to improve the resolution of the surface.

Furthermore, the surface can be quickly generated by simply assembling the desired number of the threaded members within a suitable support structure, and then rotating each threaded member a sufficient number of times to properly locate each threaded member according to the requirements of the particular article being formed or worked. Where an article has been designed by computer-aided design and manufacturing methods, the dimensional data produced by such methods can be readily used to position the threaded members in an automated manner.

When the entire surface has been generated to conform to the entire contour of the article, the surface can be used as a die cavity or a mold cavity. When used as a die or mold to form intricate articles requiring high surface quality, a metal layer can be deposited on the ends of the threaded members so as to form a more uniform die or mold surface. If used as a mold, some of the threaded members can be produced with reduced diameter portions at predetermined locations along their length to create passages through the mold.

Alternatively, the surface can be generated so as to provide a suitable fixture surface for supporting a component intended to be machined, welded or the like. As noted before, if the component has been designed by computer-aided design and manufacturing methods, the dimensional data produced by such methods can be readily used to position the threaded members in an automated manner to properly support the component on the surface, as well as to properly locate and clamp the component to the surface. In particular, some of the threaded members can be modified so as to serve as stop pins, locating pins or clamps. After a production or prototype run, the fixture can be readily reconfigured to secure and support a component having a completely different contour than the first.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein:

FIGS. 6a and 6b show an automated clamp insert mounted to a threaded rod in accordance with a particular aspect of this invention;

FIG. 7 illustrates a preferred arrangement of stop, locating and clamping inserts in accordance with this invention;

DETAILED DESCRIPTION OF THE INVENTION

In accordance with this invention, a surface generating device is provided that is capable of generating a surface which at least partially conforms to the contour of an article. The surface can be readily configured manually or automatically through the use of dimensional data provided by computer-aided design and manufacturing methods. The surface, referred to as a composite surface in the sense that it is composed of numerous individual elements, can be used as a die or mold cavity when the entire composite surface has been generated to conform to the entire contour of the article. Alternatively, the composite surface can be generated so as to provide a suitable fixture surface for supporting and securing the article while work is performed on the article, such as machining or welding. Due to its method of generation, the surface can be later reconfigured to conform to an article having a completely different contour.

Figure 1:
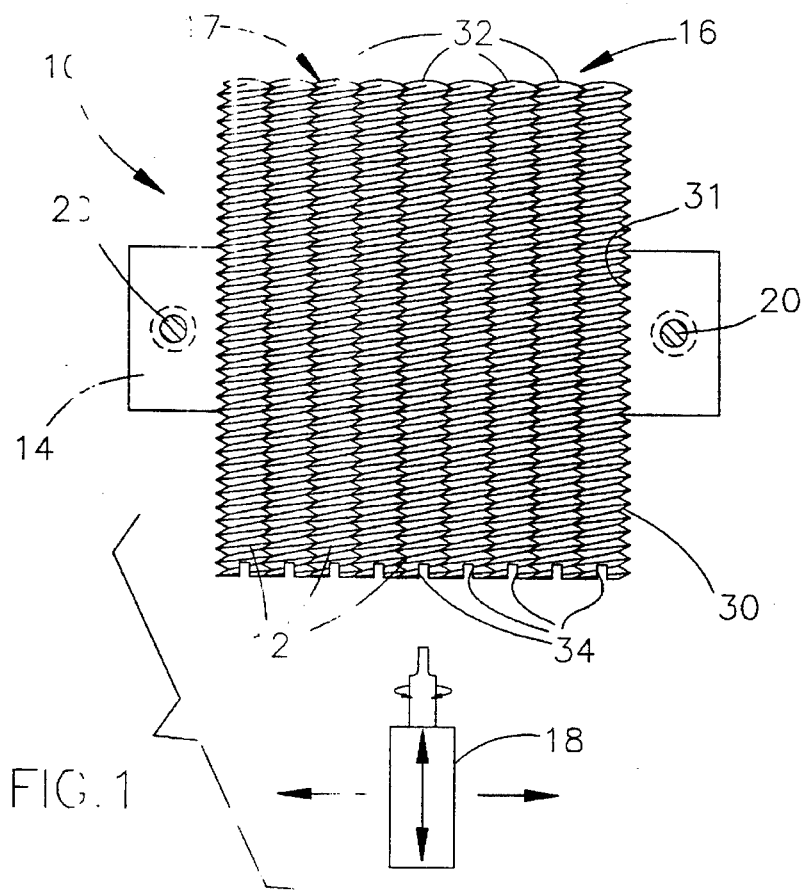
FIG. 1 is a side view of a surface generating device composed of a number of threaded rods in accordance with this invention.
Figure 2:
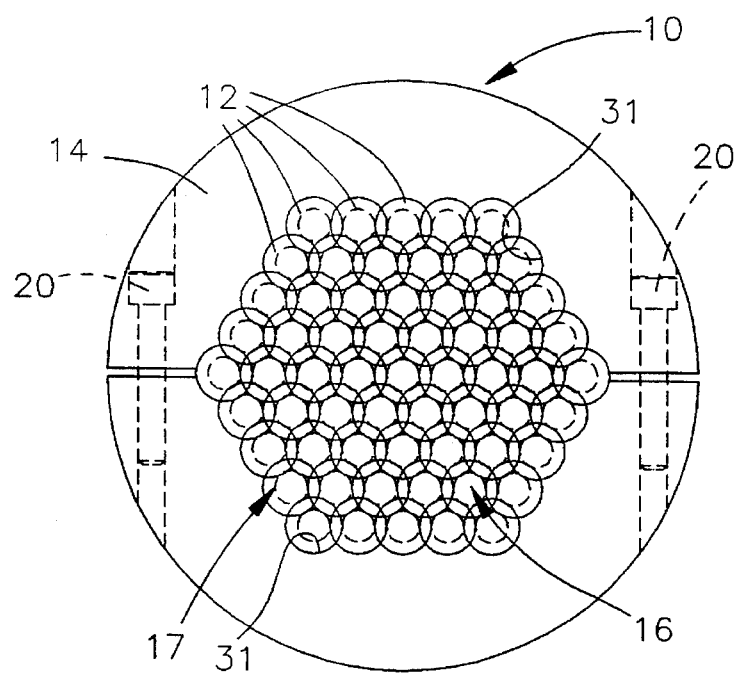
FIG. 2 is an end view of the surface generating device of FIG. 1.

Shown in FIGS. 1 and 2 is a surface generating device 10 in accordance with this invention. The surface generating device 10 includes a support structure, such as the holding frame 14 shown. The construction of the holding frame 14 can vary widely, according to the intended function of the surface generating device 10. In FIGS. 1 and 2, the holding frame 14 is a pair of frame halves held together by a pair of screws 20, though other means for securing the holding frame 14 together could be readily employed by one skilled in the art. The holding frame 14 defines an interior surface which restrains a number of threaded rods 12 within the holding frame 14. A composite surface 16 is generated by the ends 32 of the threaded rods 12. The composite surface 16 can be configured, and reconfigured as will be explained below, to form, in accordance with a first embodiment, a draw die member 17 as shown in FIGS. 1 and 2, or a mold member in accordance with a second embodiment shown in FIGS. 9 through 11, or a fixture in accordance with a third embodiment shown in FIGS. 3 through 8, all of which will be discussed in detail below. For purposes of convenience, the surface generating device 10 is illustrated as including relatively few threaded rods 12 but, as will become evident by the discussion below, the size of the surface generating device 10 and its associated composite surface 16 can vary significantly depending on the particular application.

The threaded rods 12 can be formed from any suitable material which exhibits the required durability and temperature capability for the intended process, while also being sufficiently formable and/or machinable to permit the formation of threads 30. Most often, rods formed from an appropriate steel will be most suitable, with the particular grade of steel being decided on the basis of trade-offs between mechanical properties, ease of machining, cost and hardness, however other suitable materials could also be employed depending on the particular application and requirements.

As seen in FIG. 1, the threaded rods 12 are supported by the holding frame 14 such that they are oriented to be substantially parallel to each other. In addition, threads 30 and 31 of the same pitch and pitch diameter are formed on each of the threaded rods 12 and on the interior surface of the holding frame 14, respectively, such that the threaded rods 12 are threadably engagable with each adjacent threaded rod 12 as well as the interior surface of the holding frame 14, when applicable. As a result, rotation of an individual threaded rod 12 will cause only that threaded rod 12 to be longitudinally moved relative to its adjacent threaded rods 12 and the holding frame 14, without imposing rotation on, and therefore longitudinal movement of, the adjacent threaded rods 12.

Rotation of each threaded rod 12 is preferably achieved through a suitable feature formed on the end 34 of each threaded rod 12 opposite the end 32 defining the composite surface 32. As shown, the feature is a slot which permits the manual use of a flathead screwdriver to rotate each threaded rod 12, although other means known in the art could also be used to effect the rotation. An automatic screwdriver system 18 is schematically illustrated to indicate the capability of automating the generation of the composite surface 16 through computer-controlled automation made possible by dimensional data from computer-aided design and manufacturing methods.

To facilitate automated generation of the composite surface 16, the automatic screwdriver system 18 is preferably adapted to be able to readily engage an arbitrarily positioned threaded rod 12 despite minor uncertainties in its position. A slotted head with a half-ramp form, such as those found on tamper-proof screws, would meet this requirement, but would permit only unidirectional positioning of the threaded rods 12. Where a bi-directional capability is desired or necessary, the slotted ends 34 of the threaded rods 12 could instead be provided with radial serrations or some other irregular form to positively engage a mating surface on the automatic screwdriver system 18 from any relative position. If desired, engagement could be further enhanced through the use of magnetic forces, as in an electromagnetic clutch.

For use as a draw die 17 in accordance with the first embodiment of this invention, it is preferable that the threaded rods 12 be of the same length. It is also preferable that the threaded rods 12 each have a sufficient thread height to minimize the voids between adjacent threaded rods 12, so as to maximize the packing density of the threaded rods 12. To achieve this goal, the ratio of the thread height H of each threaded rod 12 to the outside diameter D of each threaded rod 12 must be at least about 0.134 according to the formula:

$$H/D \geq 1 - \cos 30°$$

With an H/D ratio of at least about 0.134, the threaded rods 12 will be sufficiently densely packed such that no voids will be present between any group of three threaded rods 12, as illustrated in FIG. 2. This condition can be satisfied for American Standard coarse threads of up to 0.5 inch in diameter. For threaded rods 12 having larger diameters, a nonstandard thread height H would be required. For purposes of generating a composite surface 16 suitable for die and molding processes, it would not be expected that threaded rods 12 having diameters in excess of 0.5 inch would be required, in that smaller diameter threaded rods 12 would enable higher surface resolution, and would thus enable more detailed contouring of the composite surface 16.

Furthermore, many applications will require that the ends 32 of the threaded rods 12 be bonded or otherwise permanently joined together to form a more durable and uniform composite surface 16, particularly where a highly uniform die or mold surface is required, such that articles produced will have a high quality surface finish. An additional benefit which can be realized by joining the ends 32 of the threaded rods 12 together is to substantially eliminate all voids between the threaded rods 12, such that the composite surface 16 is fluid-tight. One suitable method for joining the ends 32 of the threaded rods 12 together is to precoat the threaded rods 12 with a material, such as zinc, tin or copper, as well as other materials known to those skilled in the art. After assembling the threaded rods 12 in the holding frame 14, the surface generating device 10 is heated to melt the coating and thereby fuse the threaded rods 12 together. Thereafter, the composite surface 16 can be machined to achieve the desired surface quality. Alternatively, a metal layer 90 (see FIG. 11) can be applied directly to the ends 32 of the threaded rods 12 to form a uniform coating. Most preferably, a metal spray electroplating process would be used to deposit the metal layer 90, such that the metal layer 90 sufficiently infiltrates the voids between the threaded rods 12 to a predictable depth so as to form the desired fluid-tight composite surface 16. Suitable materials for this process would be metals, such as chromium or nickel, as well as other materials known to those skilled in the art.

While a metallurgical (as opposed to mechanical) bond between the threaded rods 12 and the metal layer 90 would be most effective in developing a high strength bond, the back surface composed of the slotted ends 34 could be machined flat and reinforced by a flat plate (not shown) to supplement the strength of the bond formed at the ends 32. Accordingly, except in extremely unusual cases, a metallurgical reaction between the threaded rods 12 and the metal layer 90 would not be required.

However, if a strong metallurgical bond is required, then the choice of coating materials is restricted to materials which will react with the material of the threaded rods 12. On heating the die 17, the first reaction would be the melting of the metal layer 90, then partial dissolution and liquefaction of the adjacent threaded rod material to form an alloy. The metal layer 90 would then diffuse into the threaded rods 12, resulting in a reduction in alloy surface concentration and an increase in its melting point, followed by resolidification of the surface. Such methods are known and within the expertise of one skilled in the art.

An approach to achieving the above while simultaneously improving the mechanical properties of the die 17 would be to use low carbon steel threaded rods 12 which have been surface carburized. Since the melting point of iron carbon alloys decreases with carbon content (at least over the range of carbon content applicable here), the carbon-rich surface of each threaded rod 12 would melt first. Then, as the carbon diffused into the cores of the threaded rods 12, the melting point would increase and the surface would resolidify in the same manner described above. Because of the high diffusivity of carbon in iron, heating would have to be extremely rapid to ensure that the initial concentration gradient was maintained during the time it took to heat the die 17 to its melting point. So as to ensure that this occurs and that the temperature rise is a maximum at the threaded rod ends 32, electric resistance heating methods could be employed, although other techniques could also be used.

When configuring the composite surface 16 for a particular application, the positioning of the individual threaded rods 12 can be achieved with or without the use of an absolute position sensor (not shown). Starting from an initial state where the ends 32 of the threaded rods 12 are aligned such that the composite surface 16 is planar and substantially normal to the longitudinal direction of the threaded rods 12, the automatic screwdriver system 18 can incorporate a stepper motor or a brushless motor which can quickly and precisely position each threaded rod 12 simply by counting the number of angular steps made by the motor. For example, a 0.5 inch diameter threaded rod 12 with a standard coarse thread of 13 threads per inch, driven by a stepper motor with a low angular resolution of 12 steps per revolution, would permit positioning accuracy of about 0.006 inch. More typical stepper resolutions of 24 and 48 steps per revolution would provide positioning accuracy of 0.003 and 0.0015 inch, respectively.

In its simplest form, the automatic screwdriver system 18 can be a unidirectional drive which will suffice if the threaded rods 12 are moved only once and in one direction. Repeated reconfiguration of the same composite surface 16 generally necessitates the use of a position sensor in conjunction with the automatic screwdriver system 18. The position sensor, however, would not need to be an absolute position sensor. A very simple spring-loaded pointer, operating off the end 32 of each threaded rod 12 being positioned, could be used to make and break, at some predetermined height, an electrical contact serving as a relay to the circuit powering the automatic screwdriver system 18.

An important consideration affecting the utility of the surface generating device 10 is the amount of time required to generate a composite surface 16 having a practical size and resolution. Vertical resolution of the composite surface 16 is dictated by the accuracy of the longitudinal positioning of the threaded rods 12, as discussed above. Accordingly, suitable vertical resolution for many die applications can be achieved by properly selecting the thread pitch of the threaded rods 12 and/or the angular step size of the selected motor drive.

In contrast, high horizontal resolution at the composite surface 16 is more costly, since the number of threaded rods 12 required increases parabolically with any given linear increase in the size of the composite surface 16. As a result, significantly longer surface generation times are required for larger composite surfaces 16 if the threaded rods 12 are positioned sequentially and not simultaneously. In that simultaneous positioning would require a very complex automatic screwdriver system 18, it is anticipated that the threaded rods 12 will be individually positioned. For this reason, horizontal resolution will typically be kept to a necessary minimum, i.e., threaded rods 12 having the largest acceptable diameter will typically be used. Reduced surface resolution resulting from the use of larger threaded rods 12 can be alleviated by use of the metal layer 90 as a final step to define the composite surface 16, as discussed above, or by machining to final shape.

Another consideration regarding generation time of the composite surface 16 is the desired shape of the composite surface 16, and more specifically, how close the final average height of the composite surface 16 is to its final median height (i.e., the midpoint between the highest and the lowest point on the composite surface 16). Analytically, when starting from an initial planar composite surface 16, surface generation time will be the longest for any composite surface 16 which has its average height equal to its median height since, in such a case, creating the surface by either extension or retraction, or a combination thereof, of the threaded rods 12 will require the same total cumulative threaded rod 12 movement, and thus the same amount of time. Typically, however, the desired average surface height of a draw die 17 will be significantly above or below the median height of the composite surface 16, such that retraction or extension, respectively, of the threaded rods 12 will generate the surface faster than that of the previous "worst case" scenario. In order to have the option to select either the retract or extend mode, the automatic screwdriver system 18 preferably has a hi-directional capability.

Where male and female halves of a die are required, the surface generating device 10 of this invention can be used to simultaneously produce each half if the length of the threaded rods 12 are all the same. Specifically, by generating the desired die surface with the composite surface 16, a complementary surface is generated on the opposite surface defined by the slotted ends 34 of the threaded rods 12. In such a case, after fusing together both the ends 32 and the slotted ends 34 of the threaded rods 12, the surface generating device 10 can be cut in half, such as by electrical discharge machining, to produce a mating pair of dies 17. However, a requirement for complementary male and female molds is typically the rare exception.

In any case, once the desired composite surface 16 is generated, with or without fusing the threaded rod ends 32 or use of the metal plating, the die 17 is ready for use. Accordingly, the time required to generate the composite surface 16, based on known dimensional data of the article to be produced, will be substantially less than that required to conventionally manufacture a cast iron die. As a result, dies 17 made according to this invention are more economical for prototype or short production runs as compared to conventional cast iron dies.

Alternatively, in a second embodiment of this invention, a mold suitable for use when molding plastics or as a die casting die can also be designed and generated by the surface generating device 10, much the same as the die 17 of the first embodiment. A major difference between the die 17 and a mold is the material from which molds and die casting dies are conventionally formed. However, in the context of the surface generating device 10 of this invention, the difference becomes inconsequential, in that the surface generating device 10 is generally indifferent to the material chosen for the threaded rods 12 used to generate the mold cavity.

A more fundamental issue is the necessity to provide temperature control for molds and dies used in both plastic molding and die casting operations. Typically, this requirement is met by providing passages in the mold or die which permit water or steam to flow therethrough so as to locally cool or heat, respectively, the mold or die. Conventionally, such passages are formed by drilling interconnected holes directly into the mold or die. In terms of the present invention, it would also be possible to drill holes into the threaded rods 12 after they are assembled and supported within the holding frame 14.

Figure 9:
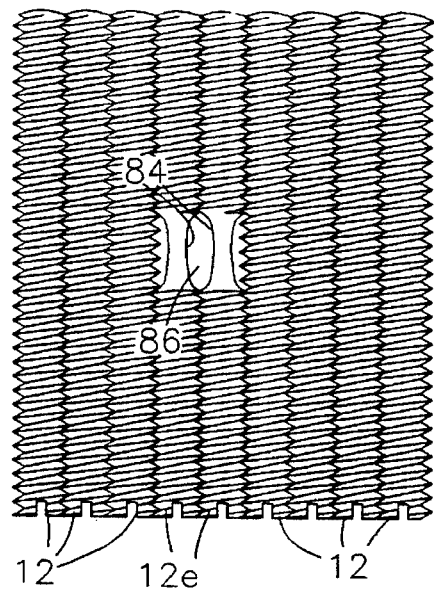
FIG. 9 shows threaded rods having reduced diameter portions for creating passages through the surface generating device in accordance with this invention.
Figure 10:
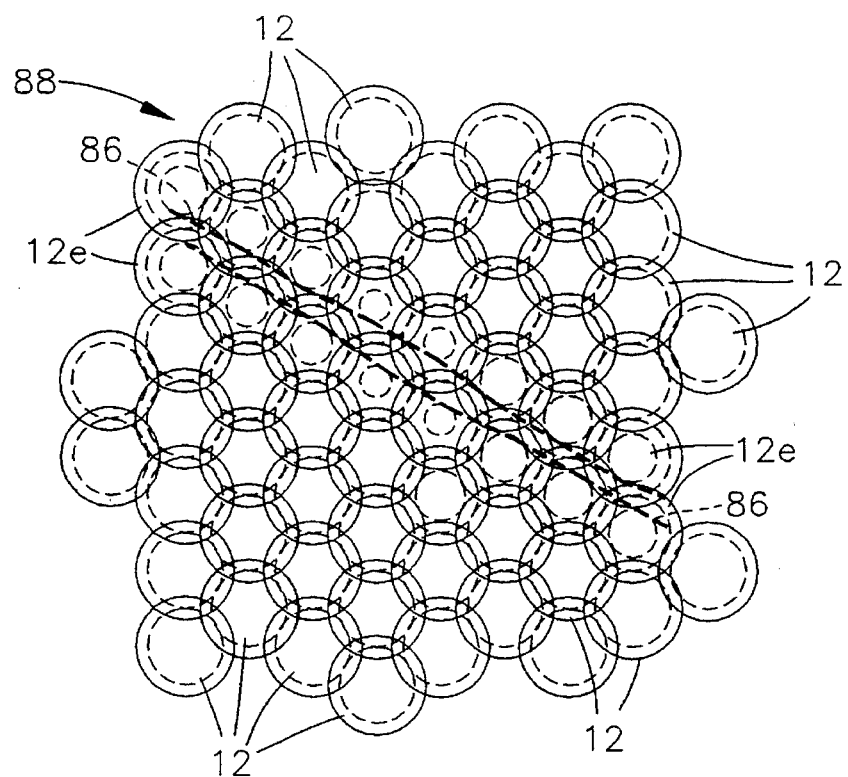
FIG. 10 is a plan view of an irregular flowpath through the surface generating device formed by reduced diameter portions on a series of threaded rods.
Figure 11:
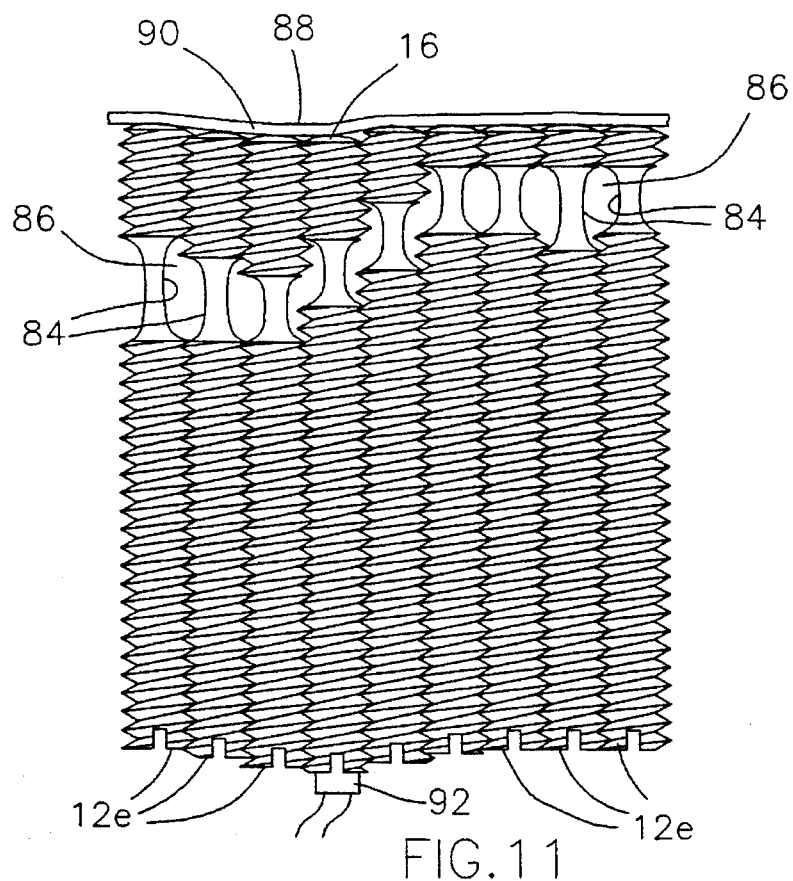
FIG. 11 is a side view of the irregular flowpath through the surface generating device of FIG. 10 in relation to the mold surface which is defined by the threaded rods.

However, as shown in FIGS. 9 through 11, and according to a preferred aspect of the present invention, passages 86 can be formed within the surface generating device 10 by providing reduced diameter portions 84 on some of the threaded rods 12e prior to assembly into the holding frame 14. Though assembly is somewhat complicated by using a predetermined arrangement of standard threaded rods 12 and "waisted" threaded rods 12e, the need for a machining operation to form the passages 86 after assembly can be eliminated. Furthermore, as shown in FIGS. 10 and 11, the passages 86 formed can be extremely irregular, being near the surface 88 of the mold or die when desirable to promote heating or cooling, and further away from the surface 88 when heat or cooling is not required or desired. The diameter of the passages 86 can also be varied along a flowpath, to either increase or decrease the flowrate of the fluid through the passage 86.

The above approach can also be used to form either male or female mold or die halves, or both if the male half is the complement of the female half, as discussed above in reference to the die 17. With this approach, some threaded rods 12 would have no reduced diameter portions 84, some may have a single reduced diameter portion 84 where a passage 86 is required in only the male or female half, while others would have two longitudinally spaced-apart reduced diameter portions 84 where both the male and female halves require a passage 86.

Accordingly, a significant advantage to forming the reduced diameter portions 84 prior to assembly of the threaded rods 12 and 12e in the holding frame 14 is that the reduced diameter portions 84 can be longitudinally positioned at predetermined locations on the threaded rods 12e, such that the path of the passages 86 through the surface generating device 10 can vary widely, depending upon the particular requirements of an application. Through appropriate computer modeling, the areas of a mold or die which require heating and cooling can be determined, as well as how efficiently the mold or die must be heated or cooled in a given region. As a result, the data generated by the computer model can be used appropriately to mass produce the threaded rods 12e, which can then be inserted at predetermined locations within the surface generating device 10. Such a capability offers the opportunity to modify flow conditions locally to the extent allowed by the diameter of the threaded rods 12 and 12e.

In addition, individual threaded rods 12 and/or 12e can be heated using cartridge heaters 92, shown schematically in FIG. 11, such that the passages 86 are used for cooling only. The cartridge heaters 92 would be attached directly to selected threaded rods 12 and 12e to further influence the temperature of the mold or die cavity in the region of the selected threaded rods 12 and 12e. Because heat is transferred through the mold or die more readily along the length of each threaded rod 12 and 12e as compared to between adjacent threaded rods 12 and 12e, the cartridge heaters 92 promote the precision by which the mold-or die surface 88 temperature can be controlled. Precise control of the mold or die temperature can be further promoted by independently controlling each cartridge heater 92. In that fast response is not critical, both temperature sensing and control of the heating cycle of each cartridge heater 92 would preferably be multiplexed to minimize power supply and controller costs.

The incorporation of passages 86 in the mold or die formed by the surface generating device 10 creates the potential for leakage between the threaded rods 12 and 12e. Furthermore, molds and dies generally require better surface quality than the dies 17 of the first embodiment, such that porosity in the mold or die surface 88 created by any spaces between the threaded rods 12 and 12e would be unacceptable. Accordingly, in a preferred embodiment, any spaces existing between the threaded rods 12 and 12e at the mold or die surface 88 must be filled.

Due to high molding temperatures typically required, particularly for die casting dies, a preferred fill material would have a relatively high melting point, such as copper or brass. To ensure adequate and uniform fill, vacuum infiltration techniques would preferably be used to draw the fill material down between the threaded rods 12 and 12e. To provide an even better surface finish, the ends 32 of the threaded rods 12 and 12e can be chromium plated. A chromium layer, such as the metal layer 90 in FIG. 11, would also maintain the chemical inertness of the mold or die and avoid a reaction between the fill material and the material to be molded or die cast.

As with the die 17 discussed above, a mold or die surface 88 generated by the desired composite surface 16 would essentially be ready for immediate use once an appropriate fill material and/or metal plating 90 has been applied to the threaded rod ends 32. Again, the time required to generate the composite surface 16, based on known dimensional data of the article to be produced, will be substantially less than that required to conventionally manufacture a mold or die casting die. As a result, mold and dies made according to this invention will also be economically practical to use for prototype or short production runs.

While much of the general discussion above is also applicable to fixtures which can be formed with the surface generating device 10 of this invention, matters such as the surface quality generated by the ends 32 of the threaded rods 12 become insignificant, as well as the need to position each and every threaded rod 12 to closely conform to the workpiece to be worked. However, to suitably function as a fixture, the surface generating device 10 must be equipped with specially adapted features that support, locate and securely clamp the workpiece to the fixture, particularly when an irregularly-shaped workpiece must be fixtured. Thus, either more than one type of threaded rod 12 is required, or the threaded rods 12 must be adaptable to perform any one of the three functions with minimal effort. The approach adopted would directly effect whether the surface generating device 10 could be automated for production runs, or require manual operation so as to be limited to prototype operations. Support, locating and clamping inserts suitable for use with the surface generating device 10 in accordance with this invention are shown in FIGS. 3 through 8.

For both prototype (manual) and production (automated) operations, the configuration of the surface generating device 10 would again be preferably established by computer-aided design and manufacturing data, similar to that for configuring the surface generating device 10 for use as a mold or die. Such information could then be used to locate the workpiece relative to the threaded rods 12 so as to properly nest the workpiece for optimal support. Again, an advantage with the surface generating device 10 of this invention is the ability to freely rotate and reposition each individual threaded rod 12 without affecting the positions of the neighboring threaded rods 12.

In addition, for purposes of use as a fixture, certain threaded rods 12 can be selected to support the workpiece at predetermined locations, while others can be selected to horizontally locate the workpiece on the fixture surface generated by the threaded rods 12, and yet others can be selected to be equipped with clamping devices to secure the workpiece to the surface generating device 10. A preferred fixturing surface 78 is illustrated in FIG. 7, wherein support threaded rods 12b, locating threaded rods 12c, and clamping threaded rods 12d are positioned on the fixturing surface 78 such that the clamping threaded rods 12d define a star-shaped pattern. Such a layout is preferred in that it would be expected to accommodate a greater variety of workpieces. The preferred construction of each of these threaded rod versions will be described more fully below.

For purposes of automation, the automatic screwdriver system 18 proposed for the molds and dies of the first and second embodiments is even more proficient for generating the fixturing surface 78, in that fewer threaded rods 12 need to be positioned to support a workpiece in comparison to generating an entire surface for use as a die 17 or mold surface 88.

However, for reconfiguring the surface generating device 10 to fixture a second workpiece having a geometry unlike a first workpiece, the method of positioning the threaded rods 12 must be altered, in that the threaded rods 12 are not initially aligned such that their ends 32 form a planar fixturing surface 78. Though stepper motors and brushless motors could be used to make very accurate adjustments from one fixturing orientation to another, the cumulative errors after a series of reconfigurations would quickly result in unacceptably large positional errors for the threaded rods 12. One solution is to completely align the threaded rods 12 prior to the composite surface 16 being reconfigured for the next workpiece. Alternatively, a position sensor of the type described previously could be used in conjunction with the automatic screwdriver system 18 to permit absolute positioning of the threaded rods 12, regardless of their initial longitudinal positions. The preferred choice between the above alternatives is determined in part by the particular requirements of the application, such as cost and desired accuracy.

Figure 3:
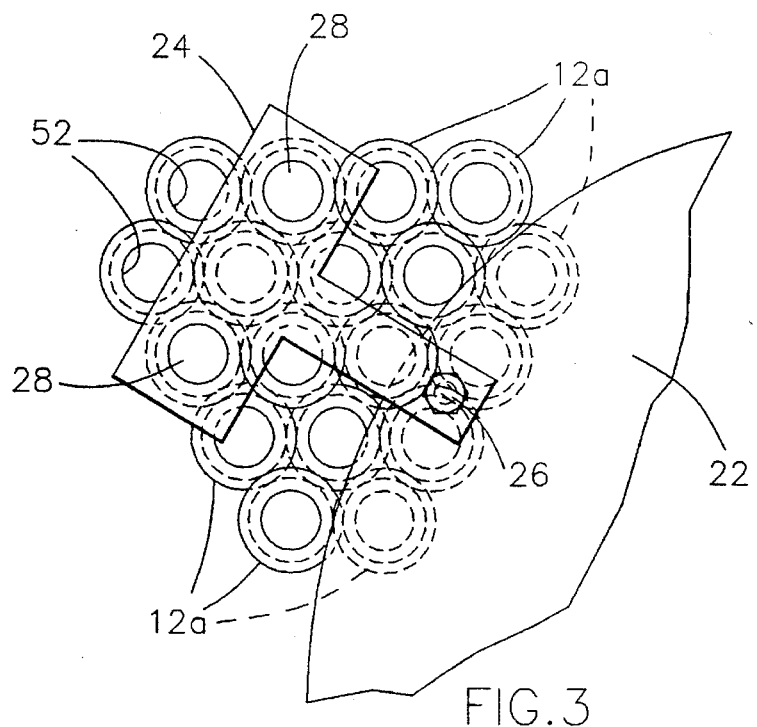
FIG. 3 shows a manual clamp secured to the surface generating device of this invention.

Referring to FIG. 3, a manual clamp 24 is shown which is suitable for fixturing a prototype workpiece 22. As shown, the threaded rods 12 are preferably hollowed threaded rods 12a having a longitudinal bore 52. In a preferred embodiment of this invention, the bore 52 is sized to receive and secure a stop insert 36 (FIG. 4), a guidepin insert 44 (FIG. 5) or a clamp insert 24 or 62 (FIGS. 3, 6a and 6b).

For prototype fixturing, the manual clamp 24 preferably has at least two pins 28 which are spaced apart so as to be simultaneously insertable into two bores 52. The pins 28 preferably extend through each corresponding threaded rod 12a and are secured to the threaded rods 12a by any suitable device, such as nuts (not shown) threaded onto the pins 28 adjacent the slotted ends 34 of the threaded rods 12a. By using two pins 28, the manual clamp 24 is prevented from rotating as it is being secured to the threaded rods 12a. As shown, an adjustment screw 26 is provided to make the actual contact with the workpiece 22, if necessary. As with the manner in which the manual clamp 24 must be secured to the threaded rods 12a, the adjustment screw 26 is suitable only for manual fixturing adjustments made for prototype operations.

Figures 4, 5:
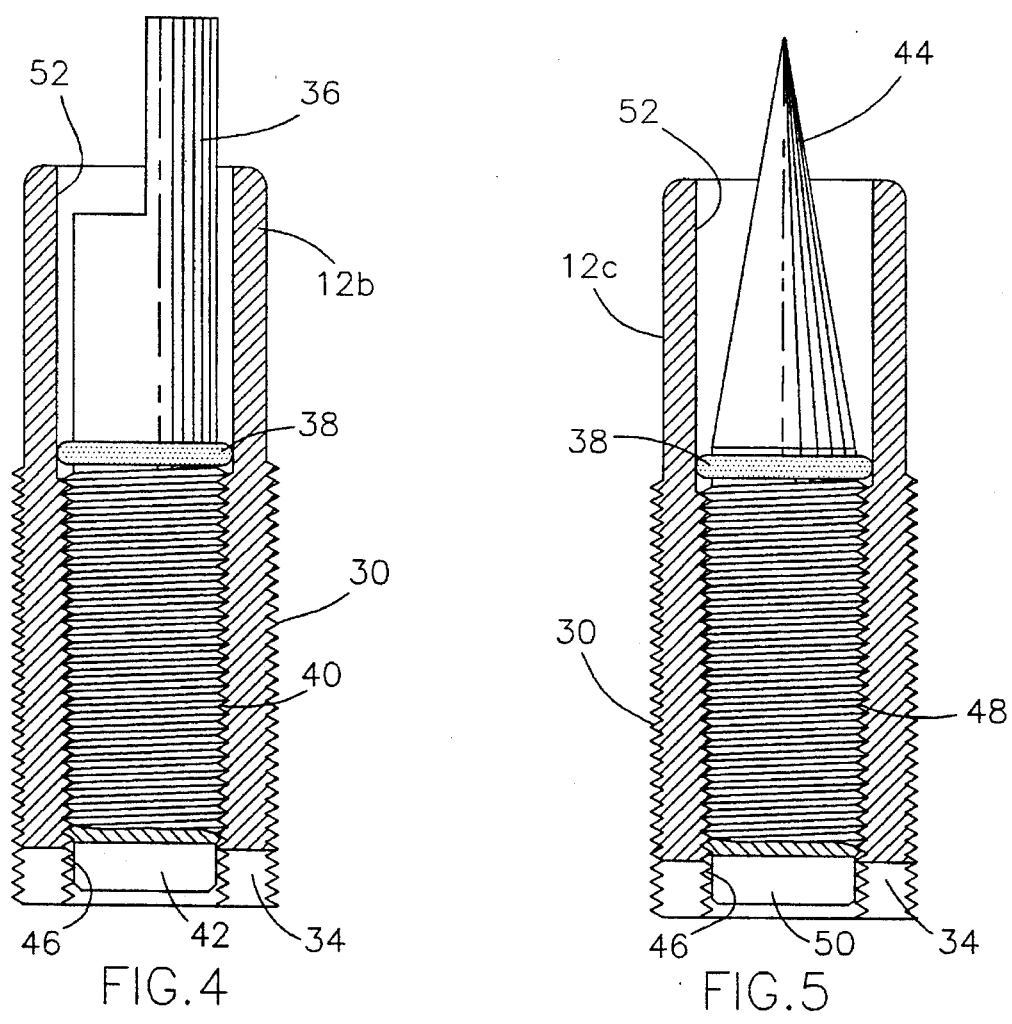
FIG. 4 shows a stop insert mounted to a threaded rod in accordance with a particular aspect of this invention.
FIG. 5 shows a locating insert mounted to a threaded rod in accordance with a particular aspect of this invention.

As shown in FIGS. 4 and 5, the hollow threaded rods used to receive and secure the stop inserts 36 and the guidepin inserts 44 are designated as threaded rods 12b and 12c. The stop inserts 36 and the guidepin inserts 44 support and locate, respectively, the workpiece 22 on the surface generating device 10. However, in contrast to the threaded rods 12a described above for the manual clamp 24, the threaded rods 12b and 12c are suitable for both manual and automated operations.

With reference to FIG. 4, the threaded rods 12b adapted for use to support the workpiece 22 have an internal thread 46 formed on the bore 52. The internal thread 46 threadably engages an external thread 40 formed on the stop insert 36, here illustrated as an eccentric stop. Similar to the threaded rod 12b, the stop insert 36 is also provided with a drive slot 42 which can be used to rotate, and thus longitudinally position, the stop insert 36 either by a hand-held screwdriver, the same automatic screwdriver system 18 described above for positioning the threaded rods 12c, or an independent adjusting device which is concentric with the automatic screwdriver system 18. To prevent machining vibrations from altering the position of the stop insert 36, an O-ring 38, or other suitable restraining device, can be positioned between the bore 52 and the stop insert 36 so as to provide frictional resistance to rotation of the stop 36. The O-ring 38 also serves to prevent swarf from contaminating the threads 40 and 46 during a machining operation.

Generally the above description is also true for the threaded rod 12c, illustrated in FIG. 5, for horizontally locating the workpiece 22 on the surface generating device 10. However, the guidepin insert 44 is preferably conical so as to allow the longitudinal position of the guidepin insert 44 within the threaded rod 12c to adapt to the size of the hole in the workpiece 22 into which the guidepin insert 44 is intended to fit. Again, the guidepin insert 44 is furnished with external threads 48 which engage internal threads 46 formed on the bore 52 of the threaded rod 12c. The guidepin insert 44 is also provided with a drive slot 50 which can be used to rotate, and thus longitudinally position, the guidepin insert 44 either by a hand-held screwdriver, the automatic screwdriver system 18, or an independent adjusting device operating concentrically with the automatic screwdriver system 18.

The similarities between the threaded rods 12a, 12b and 12c permit, in a manual operation, the manual clamps 24, stop inserts 36 and guidepin inserts 44 to be interchangeable. As a result, each fixturing surface 78 could be configured on a case-by-case basis, with the only requirement being that a surface on or locating hole in the workpiece 22 be located over a threaded rod 12a, 12b or 12c such that the appropriate stop insert 36 or guidepin insert 44 engages the surface or hole.

In an automated system, the primary difference is that the stop inserts 36 and guidepin inserts 44 must be permanently located on the fixture surface 78 to facilitate automatic operation of the fixture. In addition, the mechanism by which the workpiece 22 is clamped to the surface generating device 10 must allow automation. As noted above, the fixture surface 78 shown in FIG. 7 is suitable for a wide variety of workpieces 22 within a given size range, and therefore serves as a preferred arrangement for the threaded rods 12b and 12c on the surface generating device 10 when used as a fixture. Though it may be necessary to arrange the stop inserts 36 and guidepin inserts 44 to be part-specific, the structural similarities between the threaded rods 12b and 12c permit the stop inserts 36 and guidepin inserts 44 to be interchangeable between the threaded rods 12b and 12c, so as to allow the stop inserts 36 and guidepin inserts 44 to be quickly relocated on the fixturing surface 78. Otherwise, automated interchanging of the threaded rods 12b and 12c is also feasible using techniques analogous to the automatic screwdriver system 18, particularly in view of the relatively few stop inserts 36 and guidepin inserts 44 required for a given fixturing application.

A preferred approach to automating the clamping function of the surface generating device 10 is shown in FIGS. 6a and 6b. The preferred automated clamping mechanism includes a hollow threaded rod, denoted as threaded rod 12d, and concentrically mounted upper and lower clamp inserts 58 and 60, respectively. Similar to the stop inserts 36 and guidepin inserts 44, the lower clamp insert 60 is provided with external threads 70 which threadably engage the internal threads 46 formed on the bore 52 of the threaded rod 12d. Furthermore, the lower clamp insert 60 is provided with a drive slot 66. Again, the lower clamp insert 60 can be rotated either by hand or with an automated device such as the automatic screwdriver system 18, such that the lower clamp insert 60 can be longitudinally positioned within the threaded rod 12d.

At its upper end, the lower clamp insert 60 has a peripheral slot 74 into which a flange 72 extends radially inward from the upper clamp insert 58. As such, the upper and lower clamp inserts 58 and 60 are permanently secured together while permitting relative rotation between the two. The upper clamp insert 58 is not provided with threads, but instead has a key 56 which follows a key slot 54 formed in the bore 52 of the threaded rod 12d. As a result, the upper clamp insert 58 is prevented from rotating, such that orientation of the upper clamp insert 58 is determined by the angular position of the threaded rod 12d and not the lower clamp insert 60. As such, the upper and lower clamp inserts 58 and 60 can be raised and lowered relative to the threaded rod 12d without affecting the orientation of a clamping arm 62 mounted on the upper clamp insert 58. Preferably, the slotted end 34 of the threaded rod 12d is asymmetrical (e.g., one half of the slot is larger than the diametrically opposed half of the slot) in a manner which corresponds to the orientation of the clamping arm 62, such that the orientation of the clamping arm 62 is known based on the angular position of the asymmetric slotted end 34.

The clamping arm 62 is secured to the upper clamp insert 58 with a pivot pin 68, and is actuated by an actuator rod 64 which extends through both the upper and lower clamp inserts 58 and 60. FIG. 6a illustrates the clamping arm 62 in a deployed position, in which extension of the actuator rod 64 imposes a clamping force through the clamping arm 62 to the workpiece (not shown). FIG. 6b illustrates the clamping arm 62 in a stowed position, wherein both the upper clamp insert 58 and the actuator rod 64 have been retracted. The actuator rod 64 is preferably retracted sufficiently to pivot the end of the clamping arm 62 adjacent the pivot 68 into a cavity 76 formed in the upper clamp insert 58. Further retraction of the upper and lower clamp inserts 58 and 60 allow the clamping arm 62 to be completely stowed within the threaded rod 12d.

Figure 8:
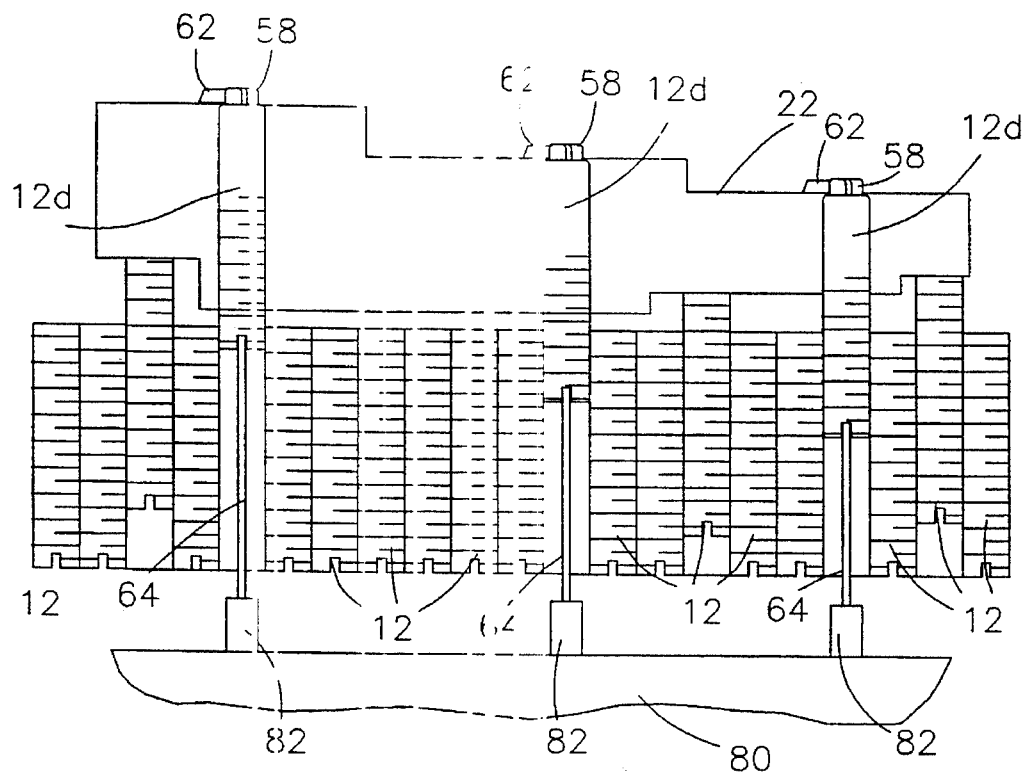
FIG. 8 illustrates a device for actuating the automated clamp inserts of FIGS. 6a and 6b in accordance with this invention.

As shown in FIG. 8, a suitable actuation system for a number of actuator rods 64 is to provide a driver plate 80 formed by a second surface generating device 10. The drive plate 80 is configured with a threaded rod 82 designated for each clamping arm 62. An actuator rod 64 is rigidly attached to each threaded rod 82 to actuate each of the clamping arms 62. By raising and lowering the driver plate 80, the clamping arms 62 of each of the threaded rods 12d are actuated to simultaneously engage and disengage, respectively, the workpiece 22. However, it is foreseeable that the clamping arms 62 might preferably be actuated individually with dedicated actuating cylinders or solenoids.

From the above description of the surface generating device 10 in terms of providing a fixturing surface 78, the process of configuring the surface generating device 10 is generally as follow. First, from the drawings and process plan for a given workpiece or part, the longitudinal position of each threaded rod 12a through 12d is determined. If manual operation is required, the manual clamps 24, stop inserts 36 and guidepin inserts 44 are manually mounted in their respective threaded rods 12a, 12b and 12c, and longitudinally positioned according to the workpiece's drawing requirements to generate the required fixture surface 78. If an automated operation is used, the necessary height of each required threaded rod 12a through 12d and their corresponding stop inserts 36, guidepin inserts 44 and clamp arms 62 is programmed into the automatic screwdriver system 18, and the appropriate fixture surface 78 is automatically generated. The surface generating device 10 is then loaded into the machining or welding center, etc., for immediate use. In the automated system, the fixture surface 78 can be automatically reconfigured if necessary or desirable, while the manual setup would require reconfiguring the fixture surface 78 by hand.

As with the dies and molds discussed above, the time required to generate the required fixture surface 78 with the composite surface 16, based on known dimensional data of the article to be machined, is substantially less than that required to fabricate a conventional fixture. As a result, fixtures made according to this invention are economically practical to use for prototype or short production runs.

From the above, it is evident that, according to a preferred aspect of this invention, the surface generating device 10 can be used to generate a variety of surfaces, each of which can be accurately achieved by the ability to appropriately position each of the threaded rods 12 and 12a–12e. Depending on the number of threaded rods 12 and 12a–12e positioned, the surface generating device 10 can generate a surface of which at least a portion thereof will conform to at least a portion of the contour of an article to be formed or a workpiece to be worked. As a result, the type of surface features possible with the surface generating device 10 of this invention is only limited by the number and diameter of the threaded rods 12 and 12a–12e used. For example, generating a very intricate composite surface 16 for a stamping, molding or die casting operation, in accordance with the first two embodiments of this invention, generally requires a large number of threaded rods 12 having relatively small diameters, so as to enhance the resolution of the composite surface 16. In contrast, generating a fixture surface 78 for a machining or welding operation, in accordance with the third embodiment of this invention, generally requires fewer but larger diameter threaded rods 12, in that surface uniformity is not a primary consideration.

Furthermore, the composite surfaces 16 which can be generated by the surface generating device 10 of this invention can be done relatively quickly by assembling the desired number of threaded rods 12, 12a–12e within a suitable holding frame 14, and then rotating each threaded rod 12, 12a–12e a sufficient number of times to properly longitudinally position each threaded rod 12, 12a–12e according to the requirements of the particular article being formed or worked. Where an article has been designed by computer-aided design and manufacturing methods, the dimensional data produced by such methods can be readily used to automatically position the threaded rods 12, 12a–12e with an automated device such as the automatic screwdriver system 18. Even where an automated capability is not possible or practicable, the surface generating device 10 of this invention can be readily, and often quickly, configured by using conventional handtools. If desired, the final surface can be developed by machining or by filling the surface as previously described.

Specific advantages associated with using the surface generating device 10 as a draw die for a stamping operation include the relatively low cost of the die 17, as well as the durable materials which can be used to form the threaded rods 12, such that a die 17 formed with the surface generating device 10 generally has a service life comparable to that of cast iron dies. Another advantage is that the requirement for a model of the article to be stamped is eliminated, in that design data can be used directly to properly position the threaded rods 12 so as to achieve the desired contours on the composite surface 16. Furthermore, surface deviations from that which is desired will be known in advance according to the known longitudinal position of each threaded rod 12, such that subsequent machining operations can be more readily anticipated and efficiently completed. In addition, a metal layer 90 deposited on the die 17 can be used to further enhance the uniformity of the die surface, so as to further minimize the mount of machining required to bring the article within its final design tolerances.

Specific advantages associated with using the surface generating device 10 as a mold or die for molding plastics or die casting metals, respectively, also include a relatively low cost, but durable mold or die which can be quickly generated, so as to eliminate the need for making patterns to determine the required dimensions of the mold or die. Furthermore, molds and dies formed with the surface generating device 10 of this invention can readily be equipped with cooling and heating passages 86. Because the passages 86 can be selectively formed by selectively locating the reduced diameter portions 84 on predetermined threaded rods 12e, the passages 86 can be customized to vary in size and distance from the mold or die surface 88, such that the degree of heating or cooling desired can be achieved. In addition, the cartridge heaters 92 can be included to further increase the precision in which the mold or die surface 88 temperature can be controlled.

Finally, specific advantages associated with using the surface generating device 10 to generate a fixture surface 78 include the ability to rapidly develop a fixture off-line which can be specifically configured to support one workpiece, then later reconfigured to support an entirely different workpiece, eliminating the need for two separate fixtures. As before, if the workpiece has been designed by computer-aided design and manufacturing methods, the dimensional data produced by such methods can be readily used to position the threaded rods 12a–12d in an automated manner so as to properly support and provide locating features for the workpiece. As a result, a vast assortment of fixtures need not be stored to accommodate short-run or prototype manufacturing operations. Due to the relatively few threaded rods 12 required to support, locate and clamp a workpiece, the time to generate the fixture surface 78 is relatively insignificant when compared to the time to conventionally fabricate a comparable fixture. Furthermore, the degree to which a workpiece is restrained by the fixture surface 78 can be customized to accommodate both thin and weak workpieces for light machining and large workpieces for rough machining. In addition, several surface generating devices 10 could be ganged together to form a larger fixture surface 78, if desired.

It is to be noted that the teachings of this invention could be employed to generate a wide variety of precision surfaces, and not just the stamping, molding, die casting, machining and welding operations specifically addressed here. Therefore, while our invention has been described in terms of a preferred embodiment, it is apparent that other forms could be adopted by one skilled in the art, for example by employing the surface generating device 10 for other manufacturing or processing purposes, or by forming the threaded rods 12 from other materials than those suggested here, or by utilizing other methods for rotating the threaded rods 12 to achieve the longitudinal positions which generate the desired composite surface 16. Accordingly, the scope of our invention is to be limited only by the following claims.

The embodiments of the invention in which an exclusive property or privilege is claimed are defined as follows:

1. A mold for forming an article having a predetermined contour, the mold comprising:

a structural frame member; and threaded members supported within the structural frame member, each of the threaded members having a thread formed thereon, at least some of the threaded members having a reduced diameter portion, the threaded members being oriented such that adjacent ends of the threaded members define a composite contour on one side of the structural frame member and such that at least some of the reduced diameter portions are adjacent each other so as to define a passage through the mold, the threads formed on each of the threaded members being threadably engaged with the threads of each adjacent threaded member such that longitudinal positioning of an individual threaded member relative to its adjacent threaded members is achieved by rotating the individual threaded member;

whereby appropriate longitudinal positioning of the threaded members relative to their respective adjacent threaded members enables the composite contour defined by the threaded members to substantially conform to the predetermined contour of the article so as to define a mold cavity for forming the article.

2. A mold as recited in claim 1 wherein the passage defines a flowpath through the threaded members for selectively heating and cooling the mold.

3. A mold as recited in claim 2 wherein the passage defines a predetermined flowpath through the threaded members as a result of the threaded members being longitudinally positioned relative to each other and the reduced diameter portions being formed at predetermined longitudinal locations on the threaded members.

4. A mold as recited in claim 1 wherein the threads formed on each of the threaded members have a height which is sufficient to minimize voids between adjacent threaded members.

5. A mold as recited in claim 1 wherein the threaded members are threaded cylindrical rods, the threaded cylindrical rods having substantially the same thread pitch and pitch diameter.

6. A mold as recited in claim 1 further comprising means selectively engagable with each of the threaded members for rotating the threaded members.

7. A mold as recited in claim 1 wherein the threaded members are substantially the same length.

8. A mold as recited in claim 1 wherein the adjacent ends of the threaded members are fused together to form the composite contour.

9. A mold as recited in claim 1 further comprising a metal layer deposited on the adjacent ends of the threaded members so as to define the composite contour.

10. A mold as recited in claim 1 further comprising means for heating at least one of the threaded members.

11. A mold as recited in claim 1 wherein the structural frame member has an interior surface on which threads are formed, and wherein the threads formed on the threaded members located adjacent the interior surface of the structural frame member are threadably engaged with the threads of the interior surface, such that longitudinal positioning of an individual threaded member relative to the structural frame member is achieved by rotating the individual threaded member.

12. A mold for forming an article having a predetermined contour, the mold comprising:

a structural frame member having an interior surface, the interior surface having threads formed therein; and threaded members supported within the structural frame member, each of the threaded members having a thread formed thereon, at least some of the threaded members having a reduced diameter portion, the threaded members being oriented such that adjacent ends of the threaded members define a composite contour on one side of the structural frame member and such that at least some of the reduced diameter portions are adjacent each other so as to define a passage through the mold, the threads formed on each of the threaded members being threadably engaged with the threads of each adjacent threaded member, the threads formed on the threaded members located adjacent the interior surface of the structural frame member being threadably engaged with the threads of the interior surface, such that longitudinal positioning of an individual threaded member relative to its adjacent threaded members and the structural frame member is achieved by rotating the individual threaded member;

whereby appropriate longitudinal positioning of the threaded members relative to their respective adjacent threaded members enables the composite contour defined by the threaded members to substantially conform to the predetermined contour of the article so as to define a mold cavity for forming the article.

13. A mold as recited in claim 12 wherein the passage defines a flowpath through the threaded members for selectively heating and cooling the mold.

14. A mold as recited in claim 13 wherein the passage defines a predetermined flowpath through the threaded members as a result of the threaded members being longitudinally positioned relative to each other and the reduced diameter portions being formed at predetermined longitudinal locations on the threaded members.

\* \* \* \* \*